UNITED STATES PATENT OFFICE.

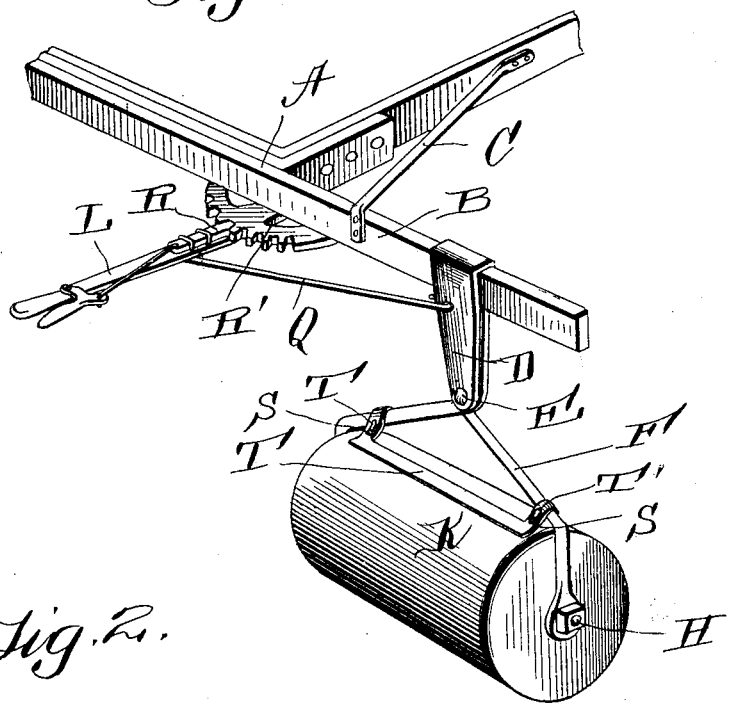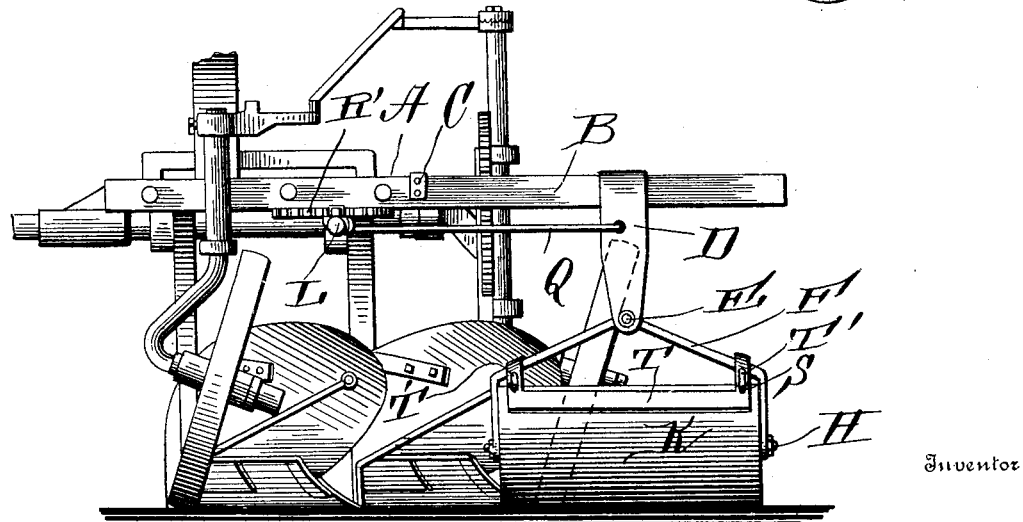

HENRY F. MOSER, OF BRAZIL, NORTH DAKOTA.

ROLLER ATTACHMENT.

No. 805,807.　　　Specification of Letters Patent.　　　Patented Nov. 28, 1905.

Application filed May 27, 1905. Serial No. 262,669.

*To all whom it may concern:*

Be it known that I, HENRY F. MOSER, a citizen of the United States, residing at Brazil, in the county of Pierce and State of North Dakota, have invented certain new and useful Improvements in Roller Attachments; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in roller attachments for plow-beams; and the object of the invention is to produce a simple and efficient attachment comprising a roller which is adjustably held upon a bar securely fastened to a plow-beam and so arranged that the roller may be moved away from or toward the plow-beam.

My invention consists, further, in various details of construction and combinations and arrangements of parts, as will be hereinafter fully described and then specifically defined in the appended claim.

My invention is illustrated in the accompanying drawings, which, with the letters of reference marked thereon, form a part of this application, and in which drawings similar letters of reference indicate like parts in the views, in which—

Figure 1 is a perspective view showing my roller attachment as applied to the beam of a plow; and Fig. 2 is a rear elevation of the device, shown as applied to the beam of a plow.

Reference now being had to the details of the drawings by letter, A designates a plow-beam of the usual construction, and at any suitable location, preferably adjacent to the rear end of the beam, a bar B is securely fastened and braced by a bar C, one end of which is fastened to the frame of the plow, as shown in the drawings.

D designates a clevis, which is movably mounted upon the bar B, and E is a pin carried by said clevis, to which the bail F is pivotally connected, the ends of said bail having eyes which form bearings for the shaft H, which passes centrally through the roller K.

Carried by the bar B is a lever L, having a bar Q, one end of which is connected to said lever and its other end fastened to said clevis. A pawl R is carried by said lever and is designed to engage the teeth of the segment R', which is fastened to the bar B.

T designates a scraper the ends of which have slots T' engaged by bolts S and so arranged that said scraper may be given a vertical movement. The edge of said scraper is so positioned that it will clean the roller of dirt which may adhere to the circumference of the same.

In operation the roller may be moved toward or away from the beam, and by the simple manipulation of the operating-lever, which is at a convenient location for the operator, and the roller mounted as shown and described will serve to roll down the earth which is turned over by the plow and may be attached to gang wheel-plows or walking-plows, as may be desired.

While I have shown a particular form of apparatus illustrating my invention, it will be understood that the same may be varied, if desired, without in any way departing from the spirit of the invention.

Having thus fully described my invention, what I claim as new, and desire to secure by Letters Patent, is—

In combination with a plow-beam, a bar securely fastened thereto, a clevis movably mounted upon said bar, a pivotal lever fixed to said bar, a link connecting said lever with said clevis, a bail pivotally mounted upon said clevis, a shaft supported by said bail, a roller journaled upon said shaft, and a scraper adjustably held upon said bail, as set forth.

In testimony whereof I hereunto affix my signature in the presence of two witnesses.

HENRY F. MOSER.

Witnesses:
　JOHN HUEHSCHMERLEN,
　CHARLES H. MOSER.